June 10, 1941.  M. WARE  2,244,749

INTERNAL COMBUSTION ENGINE

Filed Jan. 4, 1940

INVENTOR.
Marsden Ware
BY Sibbetts & Hart
ATTORNEYS

Patented June 10, 1941

2,244,749

UNITED STATES PATENT OFFICE 2,244,749

INTERNAL COMBUSTION ENGINE

Marsden Ware, Huntington Woods, Mich., assignor to Packard Motor Car Company, Detroit, Mich., a corporation of Michigan Application January 4, 1940, Serial No. 312,316

6 Claims. (Cl. 123—75)

This invention relates to internal combustion engines and more particularly to engines of the type in which fuel and air are mixed within the cylinders and ignited either by compression or a sparking system.

In one type of such engines the mixture is obtained by rotating the air charges in the cylinder and spraying fuel charges therein by means of injector devices. The air charges are usually introduced into the cylinders through passages in either the heads or the cylinder walls arranged to cause the air to rotate upon entering the cylinders. Heretofore the air inlet passages in a cylinder wall have been arranged relatively close and in one or more series communicating with one end of a manifold neck fixed to the wall. The slots are usually in circular arrangement and less than one-half of the cylinder wall. Maximum power and efficiency cannot be obtained with this type of air introduction because the air motion is not symmetrical thus causing an imperfect mixture of the fuel and air charges.

It is an object of this invention to improve the efficiency and power development of engines of the type referred to by providing symmetrical motion of the air charges while the fuel charges are being injected therein.

Another object of the invention is to improve the fuel mixture in engines of the class referred to by providing an air inlet arrangement that will cause symmetrical motion of the air charges within the cylinders.

Another object of the invention is to provide an air inlet manifold structure that encircles the cylinder of an engine, of the type referred to, so that air can be introduced into the cylinder from a plurality of ports arranged entirely around the cylinder to thus produce symmetrical movement of the air charges in the cylinder.

Still another object of the invention is to provide an air inlet structure surrounding an engine cylinder that is relatively light in weight and that can be readily applied or removed.

Other objects of the invention will appear from the following description taken in connection with the drawing, which forms a part of the specification, and in which.

Figure 2:
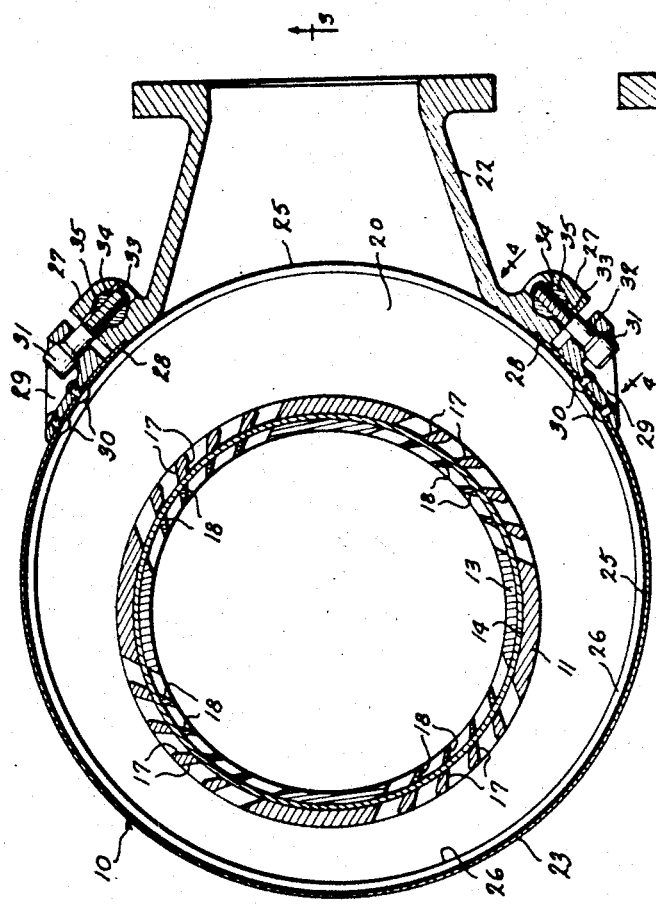
Fig. 2 is a sectional view through the cylinder taken on line 2—2 of Fig. 1.
Figure 3:
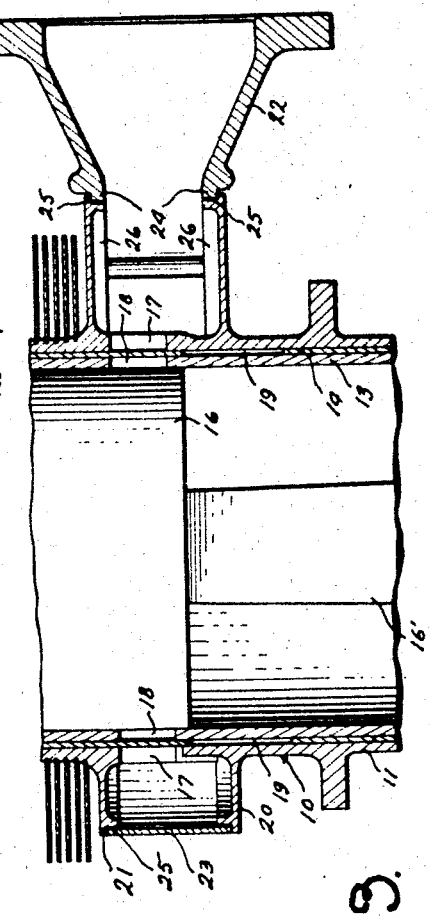
Fig. 3 is another sectional view through the cylinder structure taken on line 3—3 of Fig. 2.
Figure 1:
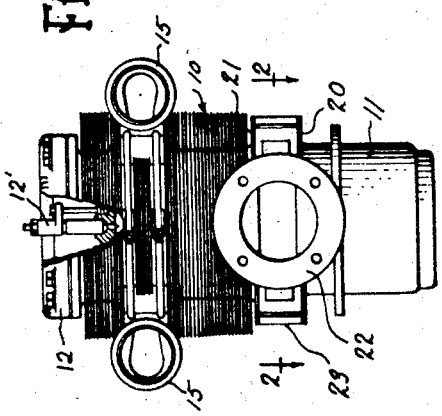
Fig. 1 is an elevational view of an internal combustion engine cylinder structure incorporating the invention.
Figure 4:
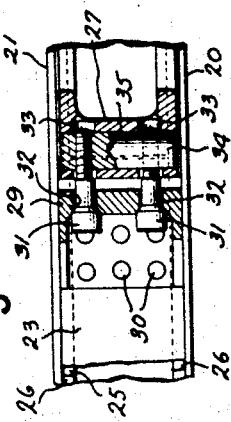
Fig. 4 is a sectional view of one of the manifold connections taken on line 4—4 of Fig. 2.

In the drawing, the numeral 10 designates generally the cylinder structure of a sleeve-valve type of internal combustion engine. The cylinder structure comprises an outer cast cylinder wall 11, on which is fixed the head 12, an inner cylinder wall 13 and a sleeve valve 14 arranged to operate between the cylinder walls. Exhaust outlet manifold elbows 15 are fixed to the head end of the cylinder structure and suitable ports (not shown) in the cylinder walls connect the elbows with the cylinder combustion chamber. The sleeve valve is operated in a conventional manner to control the passage of exhaust gas from the cylinder through the exhaust ports.

A conventional piston 16 is arranged to reciprocate in the inner cylinder wall and has a rod 16' associated therewith connected in the usual manner to a crankshaft (not shown). An injector 12' extends through the head for spraying fuel charges into the air charges in the inner cylinder. In the illustrated engine structure the mixed charges of fuel and air are ignited in the combustion chamber by the heat developed by compression.

A manifold structure and ports are formed and related to introduce air charges into the cylinder so that they will rotate and have symmetrical motion therein. The outer cylinder wall is provided with series of inlet ports 17 and the inner cylinder wall is formed with series of inlet ports 18 that align with ports 17. The sleeve valve 14 is formed with a plurality of openings 19 therethrough each of which is coextensive with one of the series of mating cylinder inlet ports. The sleeve valve in its movement will open or shut off communication between the adjacent series of inlet ports in the two cylinder walls.

The series of inlet ports are preferably arranged on a circle around the cylinder walls and extend at angles suitable to cause the air passing therethrough to rotate in the space within the inner cylinder wall, this manner of causing air rotation being conventional. There are four series of ports in each cylinder wall and the series are shown preferably as equally spaced apart, however the number of the series and their relative spacing can be varied to some extent. This arrangement of a plurality of inlet ports located on a circle around the cylinder structure will provide a plural and uniform motive power entirely around the cylinder structure causing symmetrical movement of the air charges that continues during the spraying of fuel therein. With such motion of the air charges, the air and fuel will be thoroughly mixed and properly prepared for combustion thus eliminating incomplete combustion and providing efficient engine operation and maximum power development.

A large capacity but light-weight manifold structure for feeding air to the inlet ports is provided and it is of a character such that portions thereof can be readily assembled with or detached from the cylinder structure to expose the ports. To this end a pair of circular walls 20 and 21 are provided and they are enclosed by an applied feeding neck 22 and a band 23. These circular walls are arranged in spaced parallel relation axially of the cylinder structure so that the ports 17 open into the space therebetween and they are preferably formed integral with the outer cylinder wall. Walls 20 and 21 surround and extend radially from the outer cylinder wall and the distance they project increases toward the portion engaged by the inlet neck 22. The feeding neck can be connected with a suitable air blower (not shown) if desired.

The neck terminates in parallel spaced wall ends 24 arranged to seat against ring gaskets 25 engaging facing flanges 26 extending from the outer portion of the walls 20 and 21. Band 23 also seats against the ring gaskets and with the neck forms an enclosure for the space between the walls 20 and 21. The ends of the neck walls extending between the walls 20 and 21 are formed with bosses 27 recessed at 28 to receive the underlying ends of the band. Brackets 29 extend transversely across the band end portions and are suitably secured thereto by rivets 30.

The band and neck are releasably clamped together so that they can be readily secured in leak-proof relation on or removed from the walls 20 and 21. Screw bolts 31 extend through openings 32 in brackets 29 and into openings 33 in bosses 27 where they are screwed into swivel pins 34 carried by the bosses. These pins are projected into openings 35 in the bosses traversing the bolt receiving openings 33. Obviously the screw bolts can be adjusted to pull the adjacent bosses and bracket toward each other sufficiently to tightly secure the band and neck against the gaskets on the wall flanges 26. Displacement of the band and neck in a direction axially of the cylinder structure is prevented by the walls 20 and 21. The band is preferably formed of flexible sheet metal so that it can be readily applied to and removed from the cylinder structure.

This form of manifold structure is relatively light in weight and can be quickly applied or removed. It permits the flow of a relatively large flow of air and distributes the air equally from points in a circle around the cylinder causing symmetrical motion of the air charges in the cylinder whereby engine efficiency and power development are improved. As the circular manifold around the ports is of gradually increasing radial diameter toward the inlet neck, a uniform air volume will be moved into all of the series of inlet ports.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In an internal combustion engine, the combination with a cylinder structure having a plurality of circumferentially arranged inlet ports therethrough, of a pair of circumferential walls projecting from the cylinder structure and spaced axially to confine the ports therebetween, and radially applied sectional means enclosing the space between the walls including an inlet neck and a securing band for the neck.

2. The combination with a ported engine cylinder wall structure, of a fuel feeding manifold structure having a finned head end portion and a confined ported intermediate portion comprising sections enclosing the confined ported portion of the cylinder wall structure, and means clamping said sections together.

3. In an engine cylinder structure, a cylinder having circumferential air inlet ports therethrough, spaced walls projecting outwardly from the cylinder having flanges extending toward each other inside of their periphery, said walls confining the outer ends of the ports therebetween, sectional means encircling and seated on the flanges to form therewith an intake manifold, and means clamping said sectional means together and securing the same against the flanges.

4. In an engine, a cylinder wall having circumferentially arranged air inlet ports extending therethrough, and a manifold around the cylinder wall open directly to the ports comprising a pair of integral walls and an applied closure for the walls including a flexible band and an inlet neck, said manifold increasing in interior size toward the inlet neck.

5. In an engine cylinder structure, a cylinder having a head end portion with circumferentially projecting fins and an intermediate portion with ports therethrough, a pair of circumferential walls on the cylinder confining the outer ends of said ports therebetween, said walls having portions of less diameter radially than the fins, sectional means adapted to be applied to and removed from the walls in a radial direction and to form therewith a manifold for the ports, and detachable means for securing the sectional means together and for clamping said sectional means to the walls.

6. In an engine cylinder structure, a cylinder having a head end portion with circumferentially projecting fins and an intermediate portion with ports therethrough, a pair of circumferential walls on the cylinder confining the outer ends of said ports therebetween, said walls having portions of less diameter radially than the fins, and sectional means including a flexible band and an inlet neck adapted to be applied to and removed from the walls in a radial direction and to form therewith a manifold for the ports, and detachable means for securing the sectional means together and for clamping said sectional means to the walls.

MARSDEN WARE.